March 8, 1966  A. C. ANSELM  3,239,400
METHOD OF MAKING A REINFORCED EXTERNALLY CORRUGATED LUBE
Filed Nov. 25, 1960  2 Sheets-Sheet 1
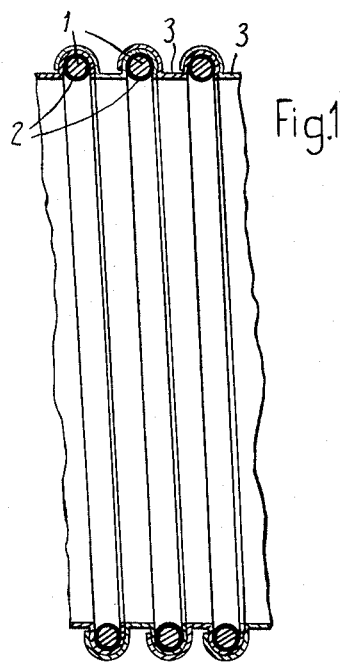
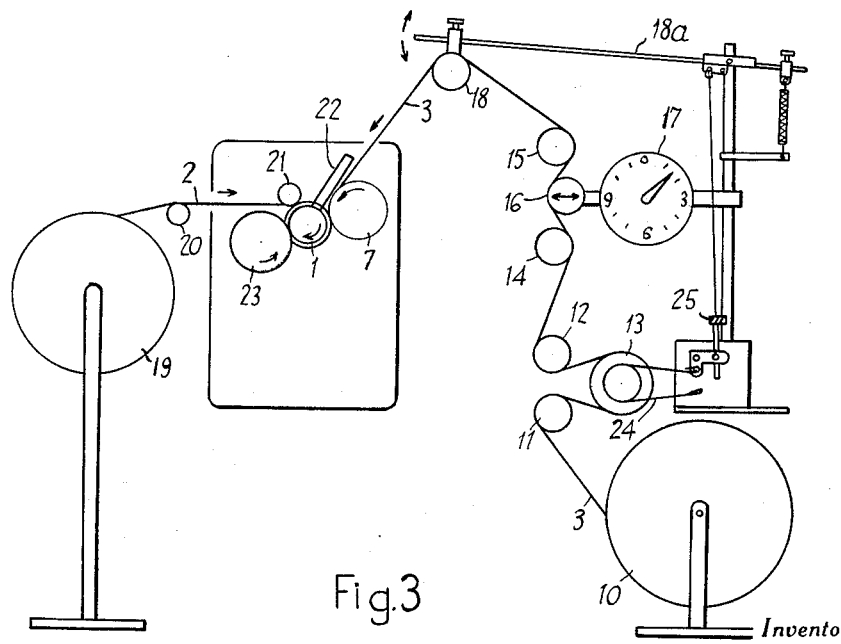
Inventor
A.C. Anselm
By
Attorneys United States Patent Office 3,239,400
Patented Mar. 8, 1966

3,239,400
METHOD OF MAKING A REINFORCED EXTERNALLY CORRUGATED TUBE
Anthony Cesar Anselm, Walton-on-Thames, England, assignor, by mesne assignments, to Techno-Chemie Kessler & Co. G.m.b.H., Frankfurt am Main, Germany, a company of Germany
Filed Nov. 25, 1960, Ser. No. 83,127
Claims priority, application Great Britain, Nov. 25, 1959, 39,987/59
5 Claims. (Cl. 156—171)

The present invention relates to the construction of tubes, particularly of relatively large diameter, for example 1" diameter or more, and to an improved method of constructing such tubes.

The present invention consists in a method of making a tube which is externally corrugated and has a substantially smooth bore and consisting of a supporting helix embedded in a helical corrugation formed around the internal surface of the tube wall, which consists in winding a reinforcing wire around a mandrel to form a reinforcing helix with adjacent turns spaced apart, helically winding a flat strip or tape, of a material having at least one face thereof constituted by thermoplastic material, around said reinforcing helix and in such manner that the edges of the wound strip overlap, heating the thermoplastic of the tape to soften the plastic to the temperature required for welding, and deforming the flat tape while softened, by means of forces acting radially, around the reinforcing helix to weld the tape to the reinforcing helix and to weld the overlapping edges of the tape together, and thereby to form a corrugated tube with the portions of the strip intermediate the turns of the reinforcing helix lying substantially on the same diameter as the internal diameter of the reinforcing helix. The radial force which is to deform the flat strip may be produced by applying an appropriate tension on the tape as it is wound on to the mandrel. Alternatively or additionally, the radial force may be provided by a pressure roller which is grooved to embrace the wire helix and to press the heated strip around the wire.

Preferably the strip is wound so that the reinforcing wire lies beneath the overlapping edges of the strip, the overlapping edges being formed around the wire and being welded together and to the wire.

The invention also consists in a tube wound of a strip of flexible material in the form of a helix with the edges of adjacent turns overlapping, the tube being reinforced by means of a reinforcing wire which is wound into a helix of the same pitch as the turns of the strip and lies internally of and beneath the overlapping portions of the strip, the said overlapping portions being stuck, bonded or welded together and to the underlying wire and being formed around the wire so that the portions of the strip intermediate the wire turns are formed inwardly and lie substantially on the same diameter as the internal diameter of the wire helix, the outer surface of the tube thus being corrugated.

In a preferred form of the invention the strip is made of a thermoplastic material such as polyethylene, polyvinyl chloride or a polyamide or of a flexible material having at least one surface thereof coated or laminated with a thermoplastic material, and the reinforcing wire is made of relatively hard grade of thermoplastic material or of metal covered with a thermoplastic material which is weldable to the thermoplastic of the strip, the overlapping edges of the turns of the strip being heat-welded together and to the wire.

The wire and strip may be simultaneously helically wound on a mandrel, the wire lying internally of the overlapping edges of the wound strip. By holding the strip tensioned during winding, the contour of its cross-section tends to form to the curvature of the wire. Alternatively or additionally, pressure rollers may be provided which are grooved to embrace the wire and to press the overlying edges of the strips around the wire and to form the strip material between adjacent turns of the wire against the surface of the mandrel on which the wire is wound. The thermoplastic material is heated in any convenient manner, for example by hot air, and the pressure rollers weld the overlapping edges together and around the plastic coating of the wire to form a strong flexible tube of which the internal bore is relatively smooth, the portions of the strip between adjacent turns of wire being pressed down to the diameter of the mandrel by the flanges of the pressure rollers. The tube may be advanced along the mandrel as it is being wound the completed tube being fed off the end of the mandrel.

In one embodiment the strip may consist of paper laminated with a thermoplastic layer such as polythene. The strip may have more layers laminated therewith, for example it may comprise a layer of metal foil, for example aluminium foil, having paper laminated on opposite surfaces thereof, at least one of the surfaces of the paper laminations being coated with or laminated with a layer of the thermoplastic material. The laminated material may be made in sheets which are subsequently cut into strips of the required width and which are wound in helical form over a wire helix made of metal and covered with a thermoplastic material weldable to the thermoplastic material of the strip.

In order that the invention may be more clearly understood, reference will now be made to the accompanying drawing, in which:

FIG. 1 is a cross section through one embodiment of a tube according to the invention.

FIG. 3 is a diagrammatic end view of the machine for making the tube.

Figure 2:
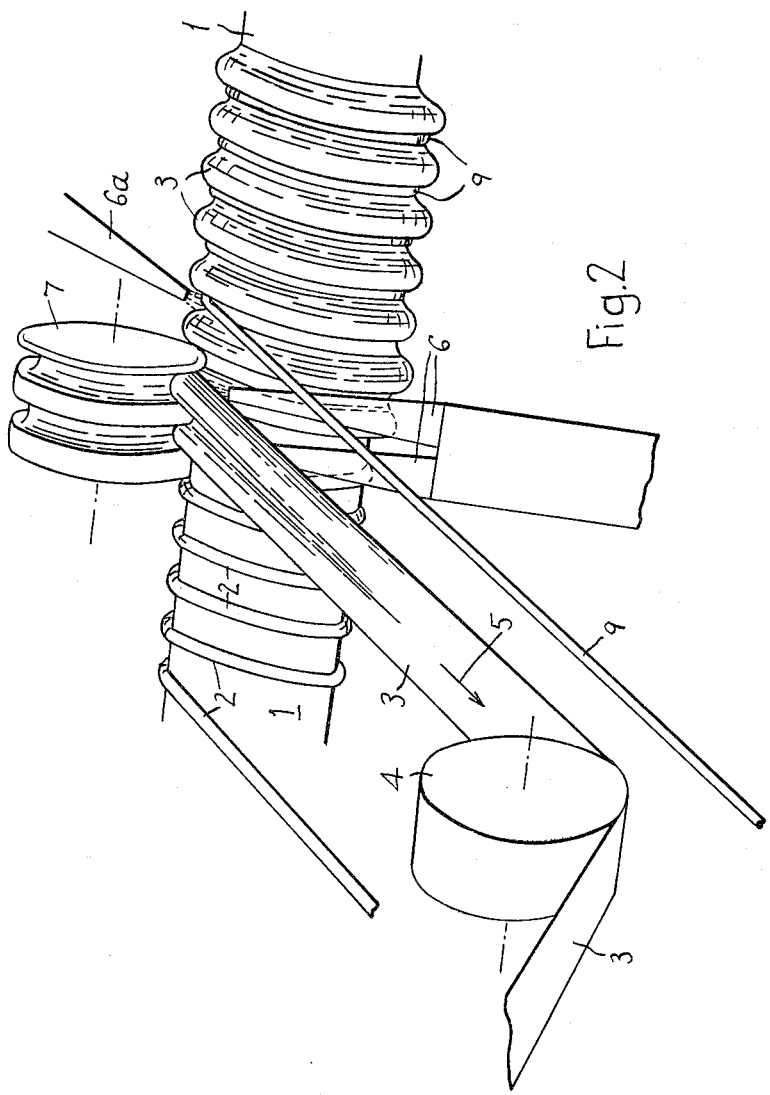
FIG. 2 is a diagrammatic perspective view illustrating the method of manufacture of the tube of FIG. 1.

Referring to FIG. 1 which shows a cross-section of a tube constructed according to the invention, 2 is the helix of metal wire covered by a layer of polythene. 3 is the strip or tape, made of or coated with a thermoplastic material 3, of which the overlapping edges are welded together and to the covering on the wire 2, being formed around the wire as shown.

FIG. 2 is a diagram explaining the method of this invention. A reinforcing wire 2, conveniently made of a thermoplastic material or of metal with a coating of plastic material, is wound around a rotating mandrel 1 to form a reinforcing helix. A flat strip or tape of thermoplastic material 3 is fed over a guide roller 4 and is wound around the helix 2 on the mandrel so that edges of adjacent turns overlap above the wire 2. The strip is held tensioned by a substanitally constant force indicated by the arrow 5. The edges of the strip 3, and also the surface of the helix 2, are heated to welding temperature by hot air from the jets 6. Other means of heating such as flame heating, may also be used. The applied tension 5 causes the cross-section of the heated strip to form around the wire. In the embodiment shown, this deformation is assisted by the grooved roller 1 which also applies pressure radially of the mandrel and presses the strip against the wire helix and the mandrel, thereby pressing the overlapping edges of the strip together and around the wire to weld the edges together and to the wire as shown in FIG. 1.

FIG. 3 is an end view of the machine and shows a preferred arrangement for tensioning the strip or tape 3. The tape 3, drawn from the spool 10, is guided by means of idler rollers 11, 12 around a braking spool 13; thence by way of idler rollers 14, 15 it is guided over the actuating roller 16 of a tension indicator 17; the tape then passes over a roller 18, mounted on a spring-controlled arm 18a, to the mandrel 1 and roller 7. The wire 2 is fed to the mandrel 1 from the spool 19 via the rollers 20, 21 and is guided in the desired pitch around the mandrel by the guide member 22. A second grooved pressure roller 23 assists the roller 7 in forming the tube and feeding it along and off the end of the mandrel as it is made.

The tension in the tape is adjusted by adjusting the brake band 24, associated with the braking spool 13, by means of the member 25. Movement of the roller 18 and the arm 18a control the braking effect to maintain a substantially constant tension in the strip 3 as indicated by the tension indicator 17.

Whilst a particular embodiment has been described it will be understood that various modifications may be made without departing from the scope of the invention. For example the tape material may be laminated with or have embedded therein reinforcing materials. Thus the tape may comprise laminations of paper, metal and/or fabric or may have fabric, threads or fibres embedded therein preferably in a manner which enables the tape to stretch both longitudinally and transversely. The tape may be laminated as it is being wound on the helix by feeding strips of the various layers together whilst the winding is taking place, the various layers being bonded together by heated rollers before reaching the mandrel or being bonded together by the heating and pressing effected around the mandrel. By winding the tube and strips of perforated material, such as wire gauze, which may be welded to the reinforcing wire helix, a tubular filter element can be made. The tube may also be wound with two wires and two strips in the form of a double helix.

In another form a second or more than two tapes may be wound on top of one another around the mandrel.

In a further modification an additional wire may be wound around the exterior of the tube to lie in the outer corrugations. Such a wire is shown at 9 in FIGURE 2. This may comprise an electrical conductor which may serve for heating the materials flowing through the tube. It may be welded in position by means, for example, of the hot air jet 6a.

I claim:

1. A method of continuously making a tube which is externally corrugated and has a substantially smooth bore, which consists in winding a reinforcing helix with adjacent turns spaced apart around a continuously rotating mandrel, said reinforcing helix having a surface of thermoplastic material, helically winding a flat tape of a material, having at least one face thereof constituted by a thermoplastic material, around said reinforcing helix and in such manner that the edges of adjacent turns of tape overlap, heating the thermoplastic material of the tape and the helix to soften the thermoplastic material to the temperature required for welding, and deforming the flat tape while softened, by means of forces acting radially, around the reinforcing helix to weld the tape to the reinforcing helix and to weld the overlapping edges of the tape together and thereby to form a corrugated tube with the portions of the tape intermediate the turns of the reinforcing helix lying substantially on the same diameter as the internal diameter of the reinforcing helix.

2. A method as claimed in claim 1, wherein the radial forces are produced by holding the tape under a constant tension while it is being wound around the mandrel and reinforcing helix.

3. A method as claimed in claim 1, which consists in producing the radial forces by pressing the tape against the mandrel to embrace the reinforcing helix and to deform the tape while softened by heat around the reinforcing helix.

4. A method as claimed in claim 2, which consists also in pressing the tape radially inwards, while held under tension, to embrace the reinforcing helix and to deform the tape while softened by heat around the reinforcing helix.

5. A method of continuously making a tube which is externally corrugated and has a substantially smooth bore, which consists in winding a wire having a surface of thermoplastic material around a continuously rotating mandrel to form a reinforcing helix with adjacent turns spaced apart, simultaneously helically winding a flat tape of a material, having at least one face thereof constituted by a thermoplastic material, around said reinforcing helix with one edge thereof disposed outside and around one turn of the helix and its other edge disposed outside and overlapping the part of said one edge which is disposed outside the previously wound adjacent turn of the helix, heating the surface of the wire and the edges of the tape to a temperature sufficient to soften the thermoplastic material so that the overlapping edges of the tape and the surface of the wire will become welded when pressed together, holding the flat tape under tension while it is being wound, and deforming the overlapping edges of the flat tape, while softened, around the reinforcing helix under a radial pressure which also causes the overlapping edges of the tape to be welded together and the inner tape edge to be welded to the surface of the wire, and discharging the wound and welded reinforced corrugated tube off the end of the mandrel as a subsequent part of the helix and tape are being wound therearound.

References Cited by the Examiner

UNITED STATES PATENTS

| | | | |
|---|---|---|---|
| 1,891,550 | 12/1932 | Lawrence | 18—56 |
| 2,225,026 | 12/1940 | Welsh | 18—56 |
| 2,539,853 | 1/1951 | Meyers et al. | 156—143 |
| 2,798,508 | 7/1957 | Kahn | 156—143 XR |
| 2,874,723 | 2/1959 | Kahn | 138—133 |
| 2,890,723 | 6/1959 | Evert | 138—122 |
| 2,949,133 | 8/1960 | Rothermel et al. | 138—122 |
| 3,019,154 | 1/1962 | Helly-Hansen | 156—143 XR |
| 3,089,535 | 5/1963 | Vohrer et al. | 156—143 XR |

EARL M. BERGERT, *Primary Examiner.*

EDWARD V. BENHAM, *Examiner.*